United States Patent [19]

Elliott et al.

[11] Patent Number: 4,566,560

[45] Date of Patent: Jan. 28, 1986

[54] MOVABLE LUBRICATOR APPARATUS

[75] Inventors: Kirk W. Elliott; Christian J. Garver; John P. Kayser, all of Madison; Robert M. Dombroski, McFarland, all of Wis.

[73] Assignee: Madison-Kipp Corporation, Madison, Wis.

[21] Appl. No.: 601,119

[22] Filed: Apr. 18, 1984

Related U.S. Application Data

[63] Continuation of Ser. No. 297,988, Aug. 31, 1981, abandoned.

[51] Int. Cl.⁴ ............... F16N 13/22; B65G 45/02
[52] U.S. Cl. .............................. 184/15.1; 198/500
[58] Field of Search ............... 184/3.1, 15.1, 15.2, 184/15.3, 16, 17; 198/488, 500

[56] References Cited

U.S. PATENT DOCUMENTS

| | | | |
|---|---|---|---|
| 2,030,533 | 2/1936 | Pate | 184/15 A |
| 2,684,733 | 7/1954 | Freiman | 184/15 A |
| 2,754,932 | 7/1956 | Clements | 184/15 A |
| 2,893,515 | 7/1959 | Schwisthal | 184/15 A |
| 2,990,916 | 7/1961 | Hillard et al. | 184/15 A |
| 3,073,415 | 1/1963 | Dutton et al. | 184/15 A |
| 3,135,355 | 6/1964 | Olsen et al. | 184/15 R |
| 3,155,191 | 11/1964 | Nelson | 184/15 R |
| 3,171,510 | 3/1965 | Olsen et al. | 184/15 R |
| 3,895,690 | 7/1975 | Thomson et al. | 184/15 A |

FOREIGN PATENT DOCUMENTS

| | | | |
|---|---|---|---|
| 584347 | 10/1959 | Canada | 184/15 A |
| 2436582 | 2/1976 | Fed. Rep. of Germany | 500/ |
| 990906 | 9/1951 | France | 184/15 A |

Primary Examiner—David H. Brown
Assistant Examiner—John E. Griffiths
Attorney, Agent, or Firm—Marshall, O'Toole, Gerstein, Murray & Bicknell

[57] ABSTRACT

Lubricating apparatus for lubricating a non-linearly traveling fitting on a conveyor. A lubricating coupler is mounted on a pivotally movable platform so that the coupler can move angularly with respect to the pivot axis. Slidable rod means on the platform enable the coupler to move substantially radially with respect to the pivot axis, so that the coupler can move over an area encompassing the expected range of travel of the non-linearly moving fitting. Locating means enable the coupler to align with the fitting. The coupler is maintained engaged with the fitting for a dwell time sufficient to adequately supply lubricant thereto. Cooperating longitudinal surfaces in the coupler body and a movable tip form simultaneous bearing and sealing surfaces for the coupler.

5 Claims, 9 Drawing Figures

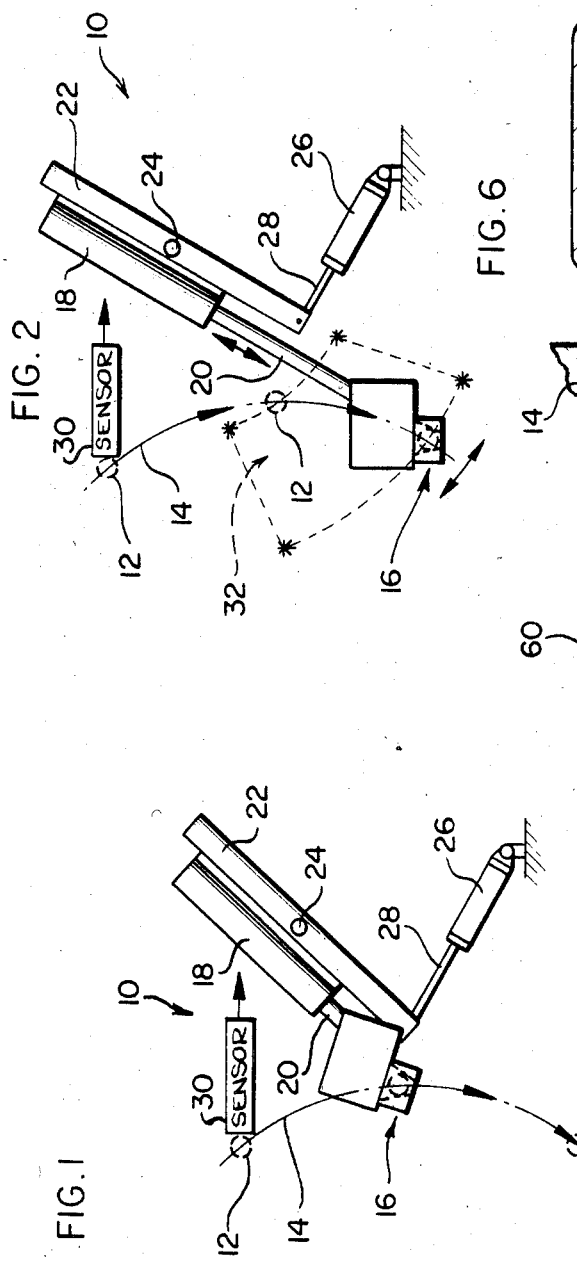
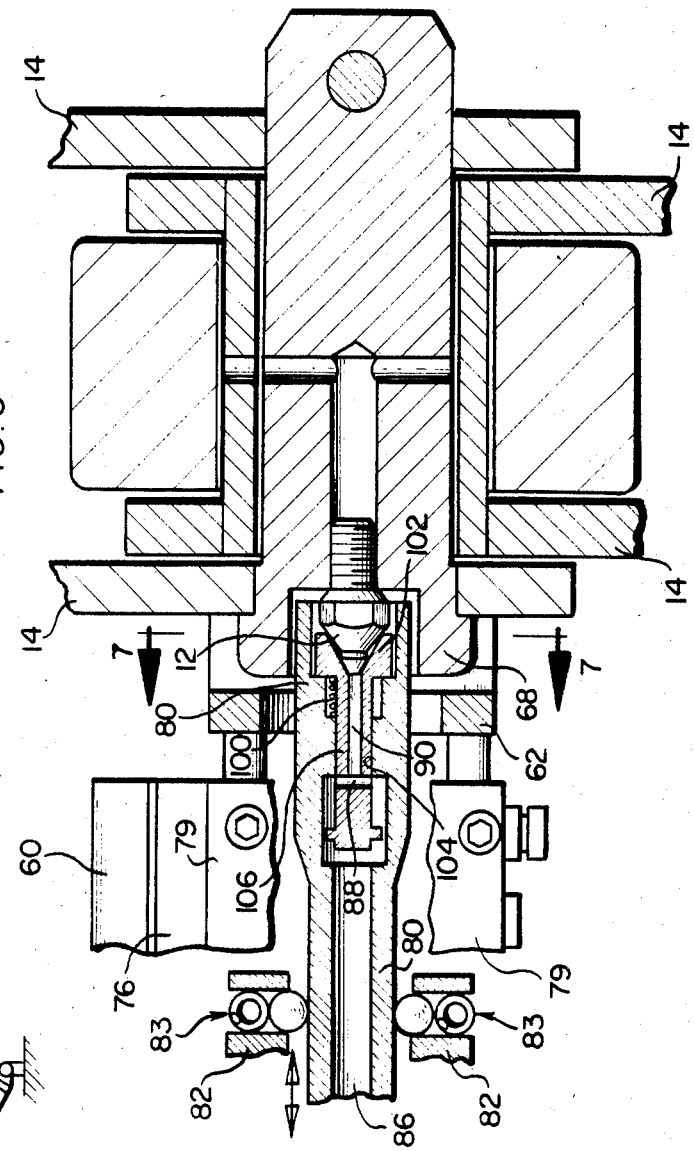
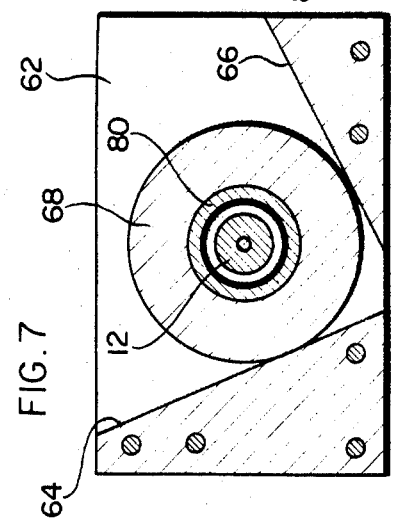

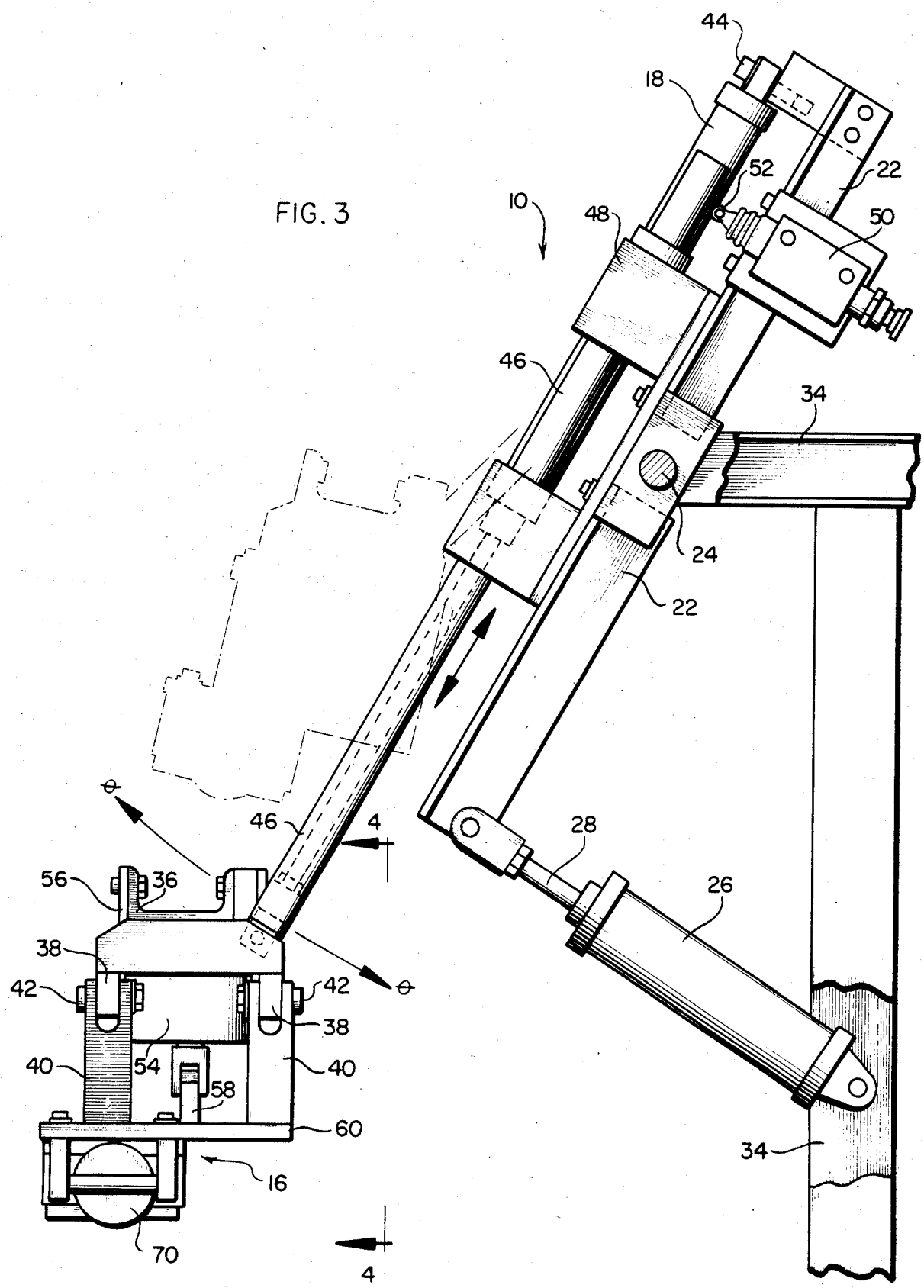

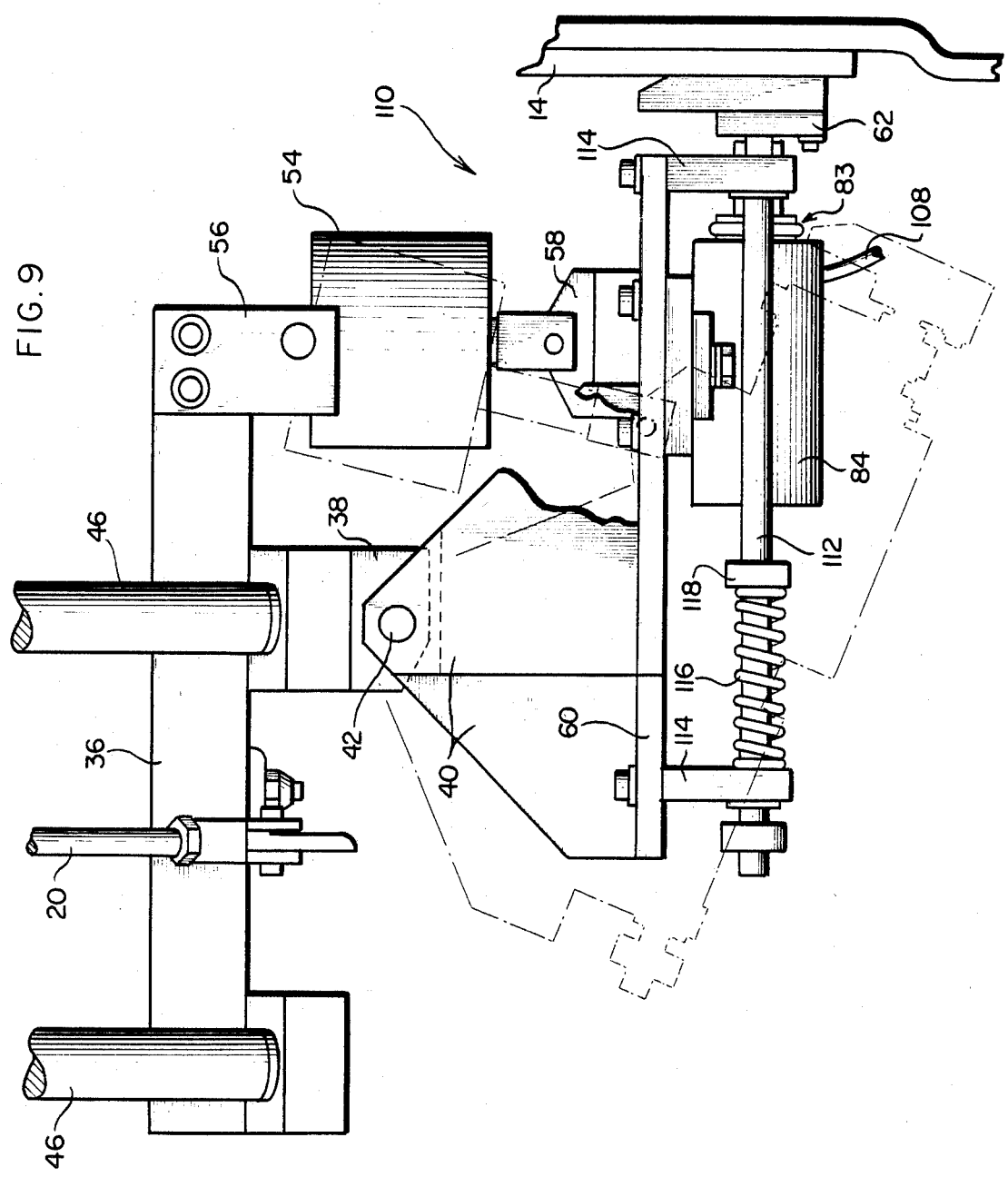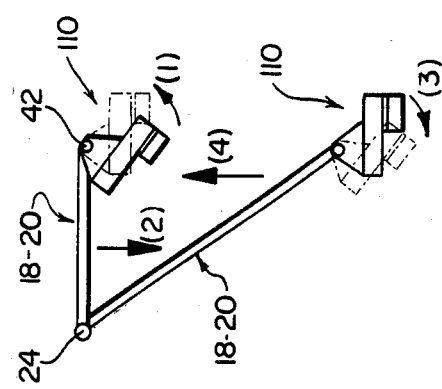

MOVABLE LUBRICATOR APPARATUS

This application is a continuation, of application Ser. No. 297,988, filed Aug. 31, 1981 now abandoned.

This invention relates to lubricating apparatus for dispensing lubricant to a lubrication point on a moving conveyor, and more particularly, to lubricating apparatus for dispensing lubricant to non-linearly traveling lubrication points on a moving conveyor.

BACKGROUND OF THE INVENTION

Reference may be made to the following U.S. patents of interest: U.S. Pat. Nos. 3,895,690; 3,171,510; 3,135,355; 2,990,916; and 2,684,733.

The aforementioned U.S. Pat. Nos. 3,895,690 and 2,990,916 describe lubricating apparatus for trolley wheels on a conveyor system which is constrained to move in a linear path by means of a trolley track or other guide. These patents illustrate a lubricator coupling which is placed into engagement with a lubricant fitting and constrained to follow the same linear path as the trolley wheel. During the dwell time, defined as the time during which the lubricator coupling is engaged with the trolley wheel lubricant fitting, a measured quantity of lubricant is supplied.

While such lubricating apparatus are satisfactory for the purposes intended, they lack the ability to satisfactorily engage and maintain engagement for a sufficient dwell time where the lubricant fitting is on a conveyor which may not move in a confined linear path. As an example, conveyors utilized in traveling water screens such as those found in electrical power generating stations and steel mills, and foundry chains, are not constrained to move in a linear path. Such traveling water screen conveyors and foundry chain conveyors move in various non-linear paths depending on respective factors such as load variation, speed, water pressure, wind loading, etc. While the above-referenced patents proposed lubricating apparatus which is able to follow a conveyor over a reasonably long path and provide sufficient lubricating dwell time, the apparatus is limited to use with conveyors which travel in a confined linear path.

In addition, there is presently available a lubricator apparatus incorporating a telescoping lubricating nozzle which extends to engage and lock with a moving lubricant fitting on a non-confined conveyor. This unit includes a double pivot and rotation action to enable the entire unit to sway and move with the conveyor during slightly non-linear conveyor movements. Although such a device is able to flex freely in several directions, it is not able to achieve the dwell time necessary to inject lubricant except at low conveyor speeds. Furthermore, it has been found that while the entire unit is able to flex freely in several directions, the lubricating coupler is fixed in position and therefore cannot maintain engagement over a sufficient dwell time except for very small deviations of the conveyor from a linear path and only over a small distance.

Accordingly, it is desired to provide an automatic lubricator which can reliably engage and maintain engagement for a sufficient dwell time for use with conveyors moving in various non-linear paths.

SUMMARY OF THE INVENTION

In accordance with the principles of the present invention, there is provided a frame positionable adjacent a non-linearly traveling conveyor having lubrication fittings moving in an extended non-linear path of travel significantly deviating from a linear path. A platform is pivotally mounted to the frame and includes a coupler assembly mounted to the platform by a slidable rod so that the coupler assembly can rotate about the platform pivot axis as well as move radially in a linear direction with respect to the platform pivot. The coupler assembly includes a lubrication coupler or nozzle which is moved into engagement with a lubricant fitting on the conveyor. Locating means are provided for locating the non-linearly traveling lubrication fitting and placing the lubricating coupler into position immediately adjacent the fitting prior to engagement. Thus, the non-linearly moving lubricant fitting is located and the lubricating coupler is placed into angularly aligned engagement therewith. During the dwell time, the coupler assembly as well as the lubricating coupler can rotate or pivot about the platform pivot axis as well as move radially with respect to the platform pivot, thereby enabling the lubricating coupler to be moved radially and angularly by the conveyor lubrication fitting so as to follow an arbitrary path of the moving conveyor over a substantial area of expected non-linear movement while maintaining coupler/fitting angular alignment.

Restraining means are provided between the platform and the frame to enable yieldable restraint on pivotal movement of the platform about the platform pivot axis. In addition, the coupler assembly is connected to a fluid operated, pneumatic cylinder/rod assembly mounted on the platform provided with a slight pressure built up in the cylinder to supply a slight amount of resistance to linear movement of the coupler assembly. The locating means includes a V-block for placement in position adjacent the conveyor such that the V-block is able to be engaged with the lubricant fitting over an expected area encompassing a range of paths which the lubricant fitting may be traveling. The V-block is adapted with slanted, convergent surfaces leading to a nest position so as to rapidly locate and nest the lubricant fitting for angularly aligned engagement by the lubricating coupler.

In one embodiment of the invention, the V-block is moved under control of a pneumatic cylinder/rod in a perpendicular direction with respect to the moving conveyor, and at the end of the dwell time is moved in a perpendicular direction away from the conveyor. In another embodiment of the invention, the V-block is pivotally moved in an arc upwardly towards and adjacent the moving conveyor for engagement with the lubricant fitting, and after the dwell time is then pivotally moved in an arc away from the movable conveyor.

An improved lubrication coupler includes cooperating respective longitudinal surfaces on the coupler body and the moving coupler tip so as to form a bearing surface as well as a sealing surface.

BRIEF DESCRIPTION OF THE DRAWINGS

The features of this invention which are believed to be novel are set forth with particularity in the appended claims. The invention, together with its object and the advantages thereof, may be best understood by reference to the following description taken in conjunction with the accompanying drawings, in which like references numerals identify like elements in the several figures and in which:

FIG. 1 is a schematic view illustrating a lubrication fitting on a non-linear traveling conveyor nested within a coupler assembly containing a lubricant coupler in position for lubrication;

FIG. 2 is a schematic view illustrating lubricating apparatus in accordance with the present invention enabling the lubricant coupler to follow the non-linearly traveling lubricant fitting during dwell time over an area including an expected range of travel;

FIG. 3 is an elevational view of one embodiment of the lubricating apparatus illustrating the platform pivot point and guide rods enabling the radial and arcuate movement of the lubricating coupler or nozzle, with the dashed lines illustrating the home position at the start of dwell time and the solid lines illustrating the lubricant coupler positioned at the end of dwell time;

FIG. 6 is a fragmented sectional view illustrating the lubricant coupler located and in engagement with a lubricant fitting on a conveyor;

FIG. 7 is a sectional view taken along section lines 7—7 of FIG. 6 illustrating the V-block for positioning the lubricating apparatus in angular alignment with the lubricant nozzle or coupler;

FIG. 8 is a schematic view illustrating a second embodiment of the invention in which a lubricating coupler moves arcuately towards and away from the lubricant fitting prior to and after dwell time, but still extends radially and angularly as in the first embodiment during dwell time; and FIG. 9 is a fragmented view illustrating a lubricating coupler of the second embodiment.

DETAILED DESCRIPTION

Figure 4:
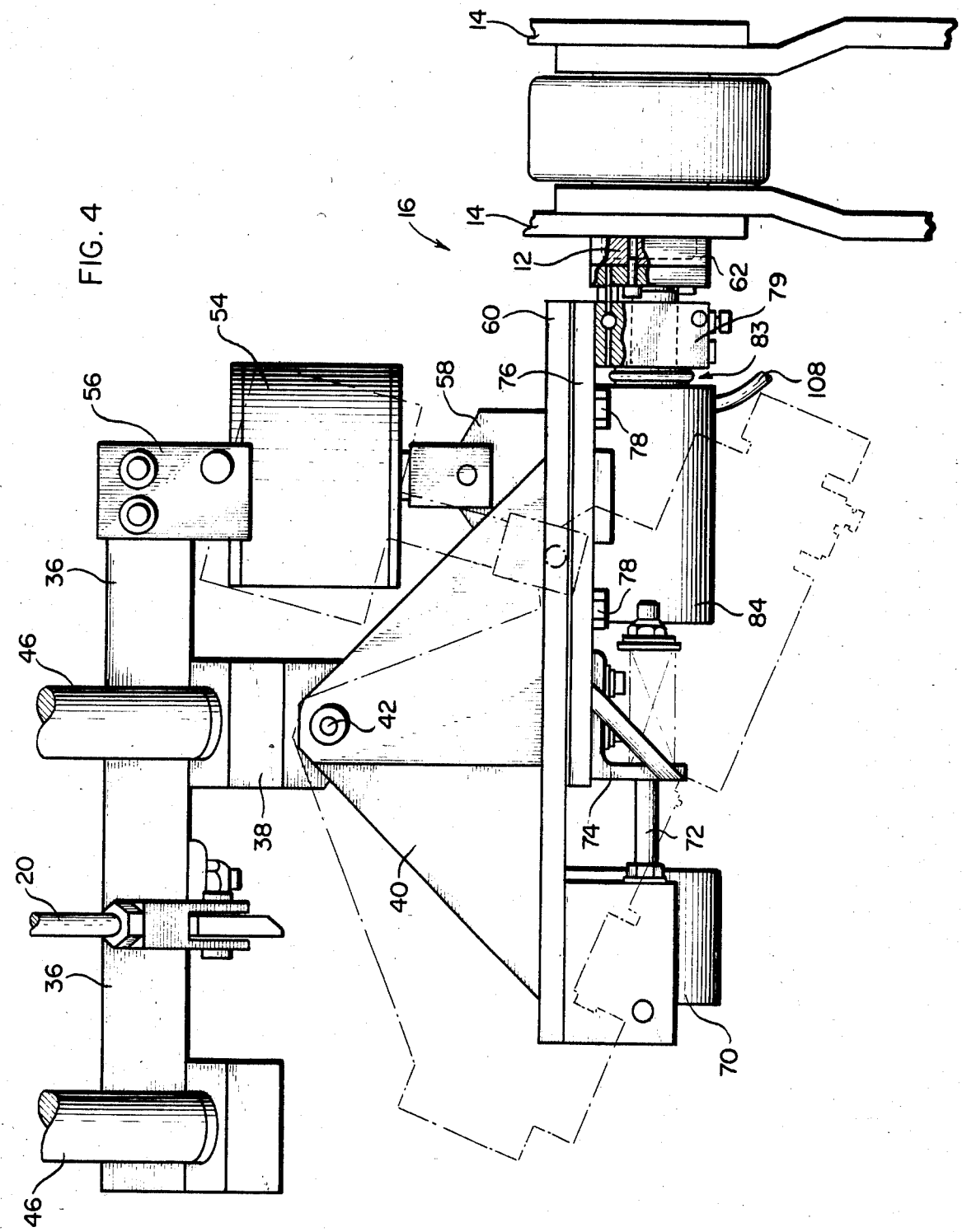
FIG. 4 is a fragmented front view taken along lines 4—4 of FIG. 3, illustrating the lubricant coupler in engagement during dwell time with a lubricant fitting of a non-linearly moving conveyor, with the dashed lines illustrating a kick-out provision in the event the coupler has traveled beyond a preset limit.

FIGS. 1 and 2 schematically illustrate a lubricating apparatus 10 in accordance with the principles of the present invention to supply lubricant to a number of lubricating points, or lubricating fittings 12 on a non-linearly moving conveyor 14 (such as the illustrated arcuate path) which may be a water screen conveyor as used in power generating stations, a foundry chain conveyor, or the like. A coupler assembly 16 includes a lubricant coupler or nozzle for supplying lubricant to a lubricant fitting during a dwell time during which the lubricating nozzle is engaged with the lubricant fitting and which dwell time extends from initial engagement as shown in FIG. 1 until disengagement immediately after the position shown in FIG. 2.

The coupler assembly is mounted to a fluid operated cylinder/rod assembly which includes a pneumatic cylinder 18 and rod 20. Cylinder 18 is affixed to a platform 22 such that rod 20 may extend therefrom so as to supportably extend coupler assembly 16 in a linear manner shown in FIG. 2. Platform 22 is pivotally mounted to a frame pivot point 24 under a yieldable constraint due to a platform pivot cylinder/rod including pneumatic cylinder 26 having one end fixed and an associated rod 28 having one end connected to platform 22. Since the coupler assembly 16 is mounted for both linear motion, substantially radially away from pivot point 24, as well as for pivotal or angular movement about pivot point 24, the associated lubricating, coupler or lubricating nozzle can follow the extended non-linearly traveling conveyor 14 over a wide area 32 defined approximately by the four corner reference points marked "*" and interconnected with the dashed lines in FIG. 2 with the associated lubricating coupler and fitting being maintained in angular alignment.

In operation, as conveyor 14 and associated, lubricating point, or lubricating fitting 12 moves in the extended non-linear path such as the arcuate path shown in FIG. 1, its position is detected by a transducer 30 which for instance may be a proximity sensor or switch supplying an appropriate signal to move coupler assembly 16 into the ready lubrication position shown in FIG. 1. As may be seen in the dashed lines of FIG. 1, the lubricating fitting is nested within a V-block in coupler assembly 16 so that the coupler assembly 16 follows the non-linear movement of the fitting. After a short, downward movement of fitting 12 on the conveyor, the lubricating nozzle is engaged with the fitting and lubricant, such as grease is injected from an adjustable volume grease metering pump through an automatic valve into the grease fitting.

After a specified amount of downward conveyor movement during which time the lubricant nozzle is engaged with the lubricant fitting, such time period defined as the "dwell time", the lubricant nozzle and fitting are disengaged. For illustrative purposes, the beginning of the dwell time period is illustrated in FIG. 1, and the position of the lubricating apparatus immediately prior to the end of the dwell time period is shown in FIG. 2. Note that the coupler 16 has moved both radially and angularly with respect to pivot axis 24 and within the area bounded by the dashed lines illustrated in FIG. 2 by the reference numeral 32.

Movement of the coupler assembly from the position shown in FIG. 1 to the position shown in FIG. 2 is yieldably resisted by a constant pressure in cylinder 18 so as to ensure that fitting 12 is centered in the nested position within the V-block and therefore angularly aligned with the associated lubrication coupler. At the end of the dwell time, the lubricating nozzle is disengaged from the lubricant fitting and cylinder 18 returns coupler assembly 16 to a home position. While two pressure levels for cylinder 18 may be used, it has been found that a single pressure level is satisfactory provided there is sufficient pressure to return the coupler assembly to the home position and to restrain the motion sufficiently to urge nesting alignment of fitting 12 into the V-block. Thus, rather than cylinder 18, a suitable spring could be used for these functions.

Suitable motion detectors such as limit switches or electronic proximity switches are adjustably mounted to the platform 22 to provide signals to a sequencing or timing control module controlling sequential operations of the lubricating apparatus, for defining the dwell time period during which the lubricant nozzle and fitting are engaged, and for activating a lubricant pump system discharging an adjustable quantity of lubricant to each fitting in a manner well known in the art.

With reference to FIGS. 3–7, there is illustrated one embodiment of the invention for enabling a lubricating coupler mechanism such as a lubricating nozzle to move both radially and angularly over an extended range and thereby maintain engagement with a non-linearly traveling conveyor in accordance with the principle of the present invention. Platform 22 is mounted by means of a rod forming pivot axis 24 to a frame 34 such that coupler assembly 16 can pivot about axis 24 as illustrated by the reference character theta in FIG. 3.

Figure 5:
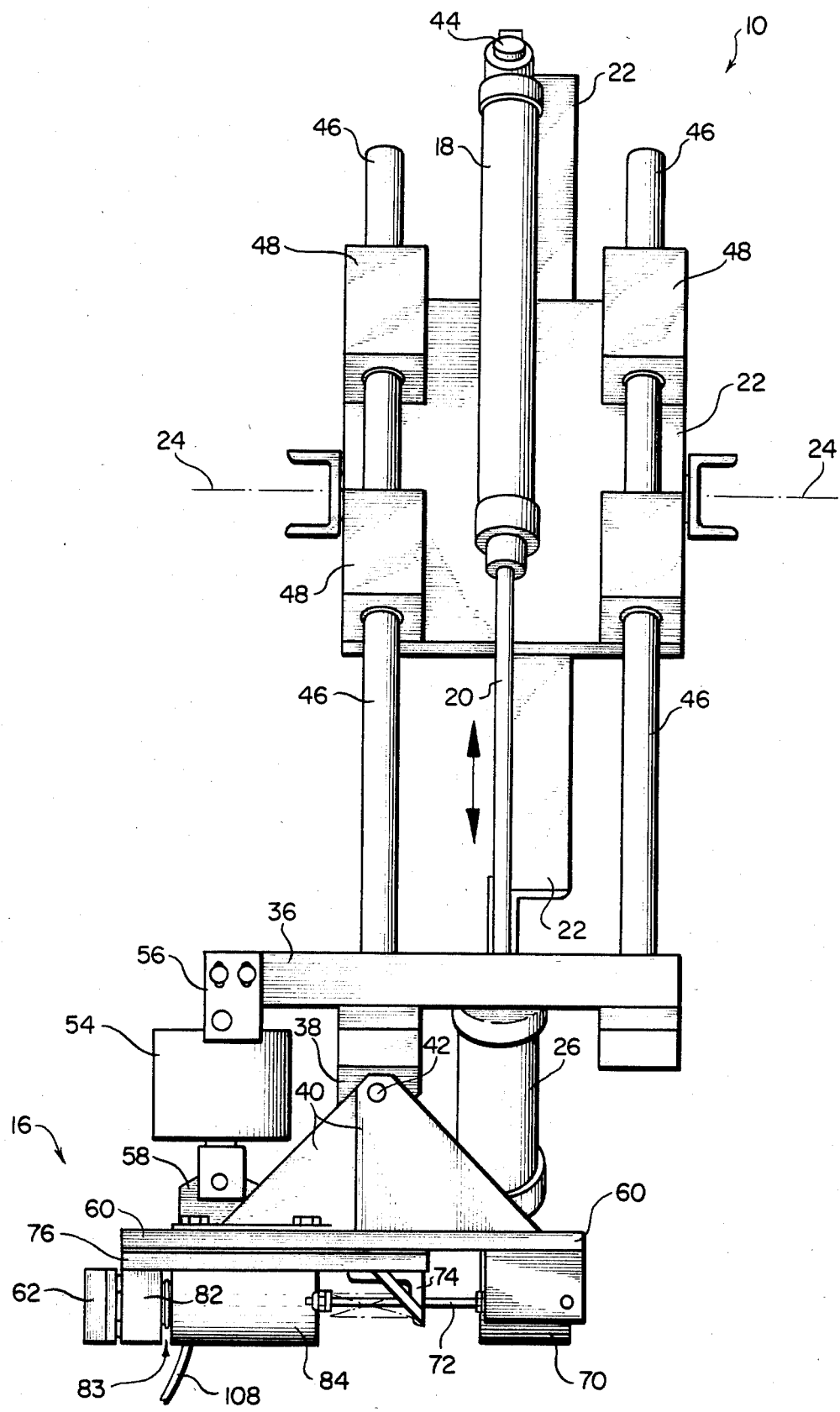
FIG. 5 is a front view of the lubricating apparatus illustrating the platform, platform pivot, guide rods and fluid operated cylinder/rod for moving the coupler within a two dimensional range sufficient for dwell time.

Coupler assembly 16 is connected to rod 20 through an intermediate carriage 36 suitably connected through brackets 38, 40 and connecting pin 42. As shown in FIGS. 3 and 5, one end of cylinder 18 associated with rod 20 is rigidly mounted to platform 22 by means of a pin 44. Also, a pair of guide rods 46 are slidably supported by suitable bearings 48 mounted to platform 22 on opposite sides of cylinder 18 and rod 20. As shown most clearly in FIGS. 4 and 5, one end of each of guide rods 46 is free, while the other end is rigidly connected to carriage 36. Thus, coupler assembly 16 is mounted for substantially radial movement with respect to platform pivot axis 24 under control of cylinder 18/rod 20 and guided by guide rods 46. A kick-out valve 50 having a sensor 52 responds to the extension of a guide rod beyond a desired limit to actuate kick-out cylinder 54 to move the coupler assembly to the dashed line position shown in FIG. 4. The upper end of kick-out cylinder 54 is pivotally mounted to a bracket 56 while the associated kick-out cylinder rod is attached to a bracket 58 mounted on a plate 60 in coupler assembly 16.

Sufficient air pressure is maintained on the kick-out cylinder to retain it in the normal position provided the guide rods have not been extended to a point which could cause an interference or damage to the device. Should such a point be reached, valve 50 is actuated to remove air pressure from cylinder 54 so as to allow the coupler assembly to rotate free of chain conveyor 14 without significant stress. The coupler assembly is returned to the normal position by the pressurization of cylinder 54.

Coupler assembly 16 includes a V-block 62 having a pair of convergent surfaces 64, 66 to aid in locating and nesting lubricant fitting 12 and associated shroud 68 as shown most clearly in FIG. 7 so that fitting 12 is in angular alignment with a lubricating coupler 80 (also see FIG. 6). V-block 62 is moved transversely with respect to conveyor 14 by means of locator cylinder 70 and associated rod 72 connected to a bracket 74 to locator plate 76, which is slidably mounted onto plate 60 by suitable sliding support means such as elongated slots in plate 60 and guide pins 78 therethrough. The V-block is rigidly mounted to a block 79 attached to plate 76. Thus, pressurization of locator cylinder 70 moves plate 76 and V-block 62 towards conveyor 14 in response to position sensing element 30. That is, position sensing element 30 detects an oncoming fitting 12 and provides a signal to initiate pressurization of cylinder 70 and thereby extend rod 72 to move plate 76 and V-block 62 towards conveyor 14. This places the V-block in position to intercept shroud 68 and lubricating fitting 12 of the conveyor.

As can be seen most clearly with reference to FIGS. 6 and 7, lubricating coupler or nozzle 80 is substantially aligned with respect to V-block 62 such that nozzle 80 can operatively engage with fitting 12 and with coupler 80 angularly aligned with a lubrication receiving channel 13 in fitting 12. Lubricating coupler 80 is slidably operated within a channel block 82, mounted on movable locator plate 76, by means of an associated fluid operated coupler assembly 84 having a rod connected to one end of the lubricator coupler. Channel block 82 includes a spring and ball bearing means 83 enabling the coupler to move slightly in all transverse directions so that the coupler tip is urged to seek and seat properly on fitting 12. Pressure actuation of coupler cylinder 84 thereby moves the lubricator coupler or nozzle 80 into the engaged position shown in FIG. 6 with lubricant fitting 12, and through a spring 100 and movable tip detail shown in FIG. 6, a passageway is opened for lubricant flow between the lubricant metering pump and fitting 12.

Lubricant coupler 80 is disengaged from fitting 12 by depressurizing coupler cylinder 84 at the end of the dwell time. During the initial stages of disengagement, the coupler tip 102 moves forward out of the coupler body 80, under the influence of spring 100, thereby closing the lubricant flow passageway. A bore 104 in coupler body 80 is sized with respect to the outer diameter of a longitudinal section 106 of tip 102 such that the bore serves as a bearing surface and a valve sealing surface. A dimensional tolerance of 0.0002–0.0004 inch between bore 104 and the outer diameter of section 106 has been found to provide the desired dual bearing and sealing function. The illustrated coupler tip shown in FIG. 6 overcomes problems in prior art structures which required separate elastomeric seal surfaces and critically aligned mating parts.

In operation of the embodiment of the invention illustrated in FIGS. 3–7, proximity switch 30 or other sensing element detects the position of an approaching lubricating point or fitting 12 to actuate locator cylinder 70 thereby moving V-block locator 62. The sequence of operations is as follows:

(1) The V-block moves forward in response to pressurization of locator cylinder 70;
(2) Shroud 68 engages the V-block and begins urging the locator block in a downward direction. This movement is yieldably resisted by cylinder 26/rod 28 and by cylinder 18;
(3) After a short downward movement, the dwell time begins when the lubricator coupler 80 moves into engagement with fitting 12 in response to pressurization of coupler cylinder 84. Through suitable connecting lines, a metered quantity of lubricant is fed via an adjustable metering pump correspondingly pressurized to dispense lubricant through a lubricant line 108, passageway 86, cross channel 88, and bore 90 into fitting 12;
(4) At the end of the required dwell time, coupler cylinder 84 is depressurized thereby retracting lubricant coupler 80 from engagement with fitting 12;
(5) Locator cylinder 70 is depressurized to retract plate 76 and V-block 62, and cylinder 18 returns coupler assembly 16 to the initial home position. Cylinder 26 is always slightly pressurized so as to maintain a constant positive pressure forcing cylinder rod 28 upwardly out of the cylinder, thereby urging the platform 22 into the home position.

As can be seen, in the embodiment of FIGS. 3–7, when the V-block locator 62 has successfully engaged a locating surface such as the protruding lubricant fitting or shroud on the chain conveyor, the lubricating coupler may then be engaged with the fitting, and the coupler assembly is enabled to move within the path which follows the non-linearly moving lubricant fitting over a substantial area. A prototype of the embodiment shown in FIGS. 3–7 has been constructed and tests conducted on the prototype indicate the apparatus performs satisfactorily.

A second prototype has been constructed as an alternative, and in most cases the preferred embodiment, incorporating the principles of the invention with additional features of having less components, more economical to construct, and having reduced wear characteristics. As noted with respect to FIGS. 6 and 7, at the end of the dwell time, repeated retraction of V-block 62 may eventually cause wear points on shroud 68 from the sliding contact thereof with convergent surfaces 64 and 66. A suitable selection of respective materials for the V-block and shroud, or surface coatings may substantially eliminate the potential wear problem or reduce it to a tolerable level.

In the second embodiment of the invention, the potential wear problem is completely eliminated. Specifically, V-block 62 is rotated upwardly into position adjacent chain 14 so as to meet shroud 68 and fitting 12 as they descend downwardly. At the end of the dwell time, the coupler assembly is pivoted away from the chain 14 thereby enabling a substantially non-sliding disengagement of the V-block convergent surfaces 64, 66 with shroud 68. The upwardly pivoting movement of the V-block prior to the dwell time and the downwardly pivoting of the V-block after the dwell time is provided by suitable pressurized operation of cylinder 54. Thus, the second embodiment eliminates the necessity in the first embodiment of having locator plate 76 slide with respect to coupler plate 60, thus eliminating the need for locating cylinder 70, rod 72, slots in plate 60, and guide pins 78.

FIG. 8 schematically illustrates the movement of the second embodiment with the uppermost solid line indicating the home position and the V-block in coupler assembly 110 being pivoted upwardly as shown by the reference arrow (1) to locate an approaching, sensed lubricant fitting. Thereafter, the coupler assembly 110 is driven downwardly as shown by the reference arrow (2) in the same manner as with the first embodiment to follow the lubricant fitting during the dwell time. At the end of the dwell time, the coupler assembly is pivoted away from the chain conveyor as shown by the reference arrow (3) to disengage the coupler. Reference arrow (4) illustrates the return of the coupler assembly to the home position in the same manner as with respect to the first embodiment. When the next lubricant fitting is sensed by sensing element 30, coupler assembly 110 is again pivoted upwardly to meet the fitting as shown by reference arrow (1), which corresponds to the initial operation, thereby repeating the cycle.

FIG. 9 illustrates the construction of coupler assembly 110 in the second embodiment, it being understood that the additional components which are not illustrated in FIG. 9 are the same as in the first embodiment previously described. In coupler assembly 110, V-block 62 is mounted at one end of a rod 112 which is supported by a pair of journal bearings 114 on plate 60. A spring 116 is suitably mounted on rod 112 between one of the journal bearings and a stop 118 rigidly attached to the rod. The spring resiliently urges the V-block against the shroud and thereby provides sufficient compliancy in the coupler assembly to permit reliable engagement of the lubricator nozzle and fitting during the dwell time.

At the end of the dwell time cylinder 54 is actuated to downwardly pivot coupler assembly 110 to the illustrated dashed line position. When the apparatus is in the home position and the next lubrication point is sensed, cylinder 54 is again actuated to upwardly pivot coupler assembly 110 in a ready position to mate with the lubrication point.

The foregoing detailed description has been given for clearness of understanding only, and no unnecessary limitations should be understood therefrom, as modifications will be obvious to those skilled in the art.

We claim:

1. Lubricating apparatus for supplying lubricant through a lubrication coupler to a nonlinearly traveling lubrication point on a conveyor moving along an extended non-linear path, said apparatus comprising:

a frame positionable adjacent said moving conveyor;

coupler means including a coupler assembly having a lubrication coupler at one end thereof to move said coupler into engagement with said lubrication point for dispensing lubricant into said point during movement of said conveyor;

platform means including a platform pivotally mounted to said frame along a pivot axis including longitudinal rod means slidably mounted on said platform and mounted to said coupler assembly for enabling said coupler to move over an extended path over about 50% of the length of said longitudinal rod means in a linear direction with respect to the platform, and restraining means engaged between said platform and said frame to yieldably restrain pivotal movement of said platform;

locating means for locating said non-linearly traveling lubrication point during conveyor movement and adapted for placing said lubrication coupler immediately adjacent said lubrication point into a lubrication ready position;

said locating means including a V-block mounted to said coupler assembly at said one end thereof and having a pair of convergent surfaces defining a nesting position therebetween aligned with said lubrication coupler for nestably, engageably receiving said lubrication point when said lubrication coupler is placed in said lubrication ready position;

said locating means further including fluid operated cylinder means operatively connected to said V-block to move said V-block towards said moving conveyor and into said lubrication ready position immediately prior to said dwell time, and to move the V-block away from the moving conveyor and out of said lubrication ready position at the end of the dwell time;

said coupler being moved by said lubrication point while nestably engaged with said lubrication point, and being enabled by said platform means, rod means and restraining means to move angularly about said platform pivot axis as well as radially with respect to said pivot axis in an outwardly linear direction with respect to the platform in direct engagement response to the non-linear traveling of said lubrication point so as to maintain engagement with said non-linearly traveling lubrication point for a dwell time sufficient to adequately supply lubricant thereto; and said coupler assembly further including second fluid operated cylinder means adapted to move said coupler into and out of engagement with said lubrication point at said nesting position in accordance with the desired dwell time.

2. Lubricating apparatus according to claim 1, including a plate carrying said lubrication coupler and said second fluid operated cylinder means, and including means for mounting said V-block at one end and bracket means for engagement with said first mentioned fluid operated cylinder means at the other end.

3. Lubricating apparatus for supplying lubricant through a lubrication coupler to a non-linearly traveling lubrication point on a conveyor moving along an extended non-linear path, said apparatus comprising:

a frame positionable adjacent said moving conveyor;

coupler means including a coupler assembly having a lubrication coupler at one end thereof to move said coupler into engagement with said lubrication point for dispensing lubricant into said point during movement of said conveyor;

platform means including a platform pivotally mounted to said frame along a pivot axis including longitudinal rod means slidably mounted on said platform and mounted to said coupler assembly for enabling said coupler to move over an extended path over about 50% of the length of said longitudinal rod means in a linear direction with respect to the platform, and restraining means engaged between said platform and said frame to yieldably restrain pivotal movement of said platform;

locating means for locating said non-linearly traveling lubrication point during conveyor movement and adapted for placing said lubrication coupler immediately adjacent said lubrication point into a lubrication ready position;

said locating means including a V-block mounted to said coupler assembly at said one end thereof and having a pair of convergent surfaces defining a nesting position therebetween aligned with said lubrication coupler for nestably, engageably receiving said lubrication point when said lubrication coupler is placed in said lubrication ready position;

said coupler being moved by said lubrication point while nestably engaged with said lubrication point, and being enabled by said platform means, rod means and restraining means to move angularly about said platform pivot axis as well as radially with respect to said pivot axis in an outwardly linear direction with respect to the platform in direct engagement response to the non-linear traveling of said lubrication point so as to maintain engagement with said non-linearly traveling lubrication point for a dwell time sufficient to adequately supply lubricant thereto;

pivot drive means for pivoting said coupler assembly to move said V-block towards said conveyor in an arcuate path into said lubrication ready position and to move said V-block in an arcuate path away from said lubricant point at the end of said dwell time.

4. Lubricating apparatus for supplying lubricant through a lubrication coupler to a non-linearly traveling lubrication point on a conveyor moving along an extended non-linear path, said apparatus comprising:

a frame positionable adjacent said moving conveyor;

coupler means including a coupler assembly having a lubrication coupler at one end thereof to move said coupler into engagement with said lubrication point for dispensing lubricant into said point during movement of said conveyor;

platform means including a platform pivotally mounted to said frame along a pivot axis including longitudinal rod means slidably mounted on said platform and mounted to said coupler assembly for enabling said coupler to move over an extended path over about 50% of the length of said longitudinal rod means in a linear direction with respect to the platform, and restraining means engaged between said platform and said frame to yieldably restrain pivotal movement of said platform;

locating means for locating said non-linearly traveling lubrication point during conveyor movement and adapted for placing said lubrication coupler immediately adjacent said lubrication point into a lubrication ready position;

said locating means including a V-block mounted to said coupler assembly at said one end thereof and having a pair of convergent surfaces defining a nesting position therebetween aligned with said lubrication coupler for nestably, engageably receiving said lubrication point when said lubrication coupler is placed in said lubrication ready position;

said coupler being moved by said lubrication point while nestably engaged with said lubrication point, and being enabled by said platform means, rod means and restraining means to move angularly about said platform pivot axis as well as radially with respect to said pivot axis in an outwardly linear direction with respect to the platform in direct engagement response to the non-linear traveling of said lubrication point so as to maintain engagement with said non-linearly traveling lubrication point for a dwell time sufficient to adequately supply lubricant thereto; and pivot drive means for pivoting said coupler assembly to move said V-block towards said conveyor in an arcuate path into said lubrication ready position, including a fluid operated cylinder rod pivotally connected to said coupler assembly and actuable for pivoting said coupler assembly.

5. Lubricating apparatus for supplying lubricant through a lubrication coupler to a nonlinearly traveling lubrication fitting on a conveyor moving along an extended arcuate path, said fitting having a lubrication receiving channel, said apparatus comprising:

a frame positionable adjacent said moving conveyor;

coupler means including a coupler assembly having a lubrication coupler mounted at one end thereof to move said coupler into engagement with said lubrication fitting for dispensing lubricant into said fitting lubrication receiving channel during movement of said conveyor;

a fluid operated longitudinal cylinder/rod pivotally mounted to one end to said frame and at the opposite end to said coupler, including yieldable restraining means yieldably restraining pivotal movement of said fluid operated cylinder/rod, enabling said coupler to move over an extended path over about 50% of the length of said longitudinal rod means in a linear direction radially and angularly with respect to said frame in yieldable response to the nonlinear travel of said lubrication fitting during a dwell time sufficient to adequately supply lubricant thereto;

locating means for locating said non-linearly traveling lubrication fitting during conveyor movement and adapted for placing said lubrication coupler immediately adjacent and angularly aligned with said fitting lubrication receiving channel, thereby defining a lubrication ready position;

said locating means including a V-block mounted to said coupler assembly at said one end thereof, said V-block having a pair of convergent surfaces defining a nesting position therebetween aligned with said lubrication coupler for nestably, engageably receiving said lubrication fitting when said lubrication coupler is placed in said lubrication ready position;

said locating means further including actuating means for moving said V-block towards said moving conveyor and into said lubrication ready position immediately prior to said dwell time, and to move the V-block away from the moving conveyor at the end of the dwell time; and;

said coupler being moved by said lubrication fitting while nestably engaged with said lubrication fitting, and being enabled by said pivotably fluid operated cylinder/rod and said yieldable restraining means to move said coupler in a non-linear direction over an extended arcuate path of travel while maintaining said coupler angularly aligned with said fitting lubrication receiving channel.

* * * * *

UNITED STATES PATENT AND TRADEMARK OFFICE
CERTIFICATE OF CORRECTION

PATENT NO. : 4,566,560

DATED : January 28, 1986

INVENTOR(S) : Kirk W. Elliott, et al.

It is certified that error appears in the above-identified patent and that said Letters Patent is hereby corrected as shown below:

In Column 1, line 67, the word "acqordance" should read --accordance--;

In Column 3, line 27, after "and in" insert --angular aligned--;

In Column 4, line 7, delete the following: "associated lubricating coupler and fitting being maintained in angular alignment." and insert the following in its place --lubricating coupler maintained in angular alignment with fitting 12 within area 32.--

In Column 4, line 19, after the word "fitting" insert --with the associated lubricating coupler and fitting being maintained in angular alignment--.

UNITED STATES PATENT AND TRADEMARK OFFICE
CERTIFICATE OF CORRECTION

PATENT NO. : 4,566,560

DATED : January 28, 1986

INVENTOR(S) : Kirk W. Elliott, et al.

It is certified that error appears in the above-identified patent and that said Letters Patent is hereby corrected as shown below:

In Column 10, line 34, "nonlinearly" should be --non-linearly--;

In Column 10, line 54, "nonlinear" should be --non-linear--.

Signed and Sealed this

Twentieth Day of May 1986

[SEAL]

Attest:

DONALD J. QUIGG

Attesting Officer

Commissioner of Patents and Trademarks